United States Patent [19]

Shimoiizaka

[11] 4,094,804

[45] June 13, 1978

[54] METHOD FOR PREPARING A WATER BASE MAGNETIC FLUID AND PRODUCT

[76] Inventor: Junzo Shimoiizaka, 1-1-14, Komegafukuro Sendai-shi, Miyagi-ken, Japan

[21] Appl. No.: 757,037

[22] Filed: Jan. 5, 1977

Related U.S. Application Data

[63] Continuation-in-part of Ser. No. 605,306, Aug. 18, 1975, abandoned.

[30] Foreign Application Priority Data

Aug. 19, 1974 Japan .................. 49-94266
Dec. 18, 1974 Japan .................. 49-144546
Mar. 27, 1975 Japan .................. 50-37120

[51] Int. Cl.$^2$ .................. H01F 1/25; H01F 1/00; C10M 3/00; C09D 11/00
[52] U.S. Cl. .................. 252/62.52; 252/62.51
[58] Field of Search .................. 252/62.51, 62.52, 62.53, 252/62.54

[56] References Cited

U.S. PATENT DOCUMENTS

| | | | |
|---|---|---|---|
| 3,214,278 | 10/1965 | Hanneman | 252/62.52 |
| 3,531,413 | 9/1970 | Rosensweig | 252/62.62 |
| 3,917,538 | 11/1975 | Rosensweig | 252/62.51 |
| 3,990,981 | 11/1976 | Kovac et al. | 252/62.54 |

Primary Examiner—F.C. Edmundson
Attorney, Agent, or Firm—Flynn & Frishauf

[57] ABSTRACT

A water base magnetic fluid is provided by adding an unsaturated fatty acid with 18 carbon atoms or a salt thereof into a colloidal solution of a ferromagnetic oxide power in water, subsequently adding an acid solution to the colloidal solution to develop a precipitate by a flocculation, separating the precipitate from the solution, and adding an anionic surfactant with 8 to 30 carbon atoms, or a non-ionic surfactant with 8 to 20 carbon atoms and with H.L.B. of 12 or more, to the separated precipitate in water to peptize the precipitate. The water base magnetic fluid is a stable suspension of the ferromagnetic powder in water. Each particle of the ferromagnetic powder in the fluid is coated with a monomolecular layer of the ionized unsaturated fatty acid and with the non-ionic or anionic surfactant layer being adsorbed on the first monomolecular layer. The average particle size of the ferromagnetic powder may be 150 Å or less.

22 Claims, 7 Drawing Figures

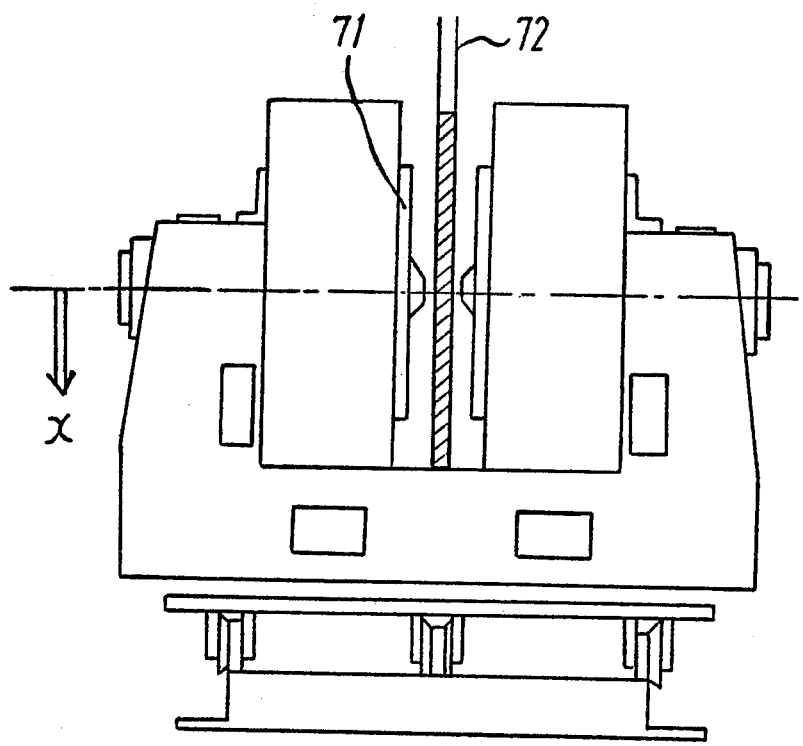

METHOD FOR PREPARING A WATER BASE MAGNETIC FLUID AND PRODUCT

CROSS-REFERENCE TO RELATED APPLICATIONS

This is a continuation-in-part application of my previous patent application Ser. No. 605,306 filed Aug. 18, 1975 (abandoned).

BACKGROUND OF THE INVENTION

This invention relates to a method for preparing magnetic fluids, and, more particularly, to a method for preparing stable water base ferromagnetic fluids.

The magnetic fluid is a stable suspension of magnetic particles with a particle size, normally less than 300 Å, in a carrier fluid. The suspension does not settle out under the influence of gravity or even of a magnetic field. The magnetic fluid responds to an applied magnetic field as if the fluid itself had magnetic characteristics.

Magnetic fluids have been used in various fields; for example, pumps, bearings, seals, specific gravity meters, or recovering oil spills.

Known and used magnetic fluid are usually stable suspensions of magnetic particles in a non-polar solvent. On the other hand, the only known method to prepare a polar solvent, such as water, base magnetic fluid is a grinding method. The resultant suspension produced by the grinding method is not sufficiently stable to satisfy the needs for various application.

If it is possible to produce stable water base magnetic fluids, economical magnetic fluids would be provided because of the low cost of the base solution.

SUMMARY OF THE INVENTION

An object of this invention is to provide a method for producing stable water base magnetic fluids.

Another object of this invention is to provide such a method for economically preparing a stable aqueous suspension of ferromagnetic particles, whereby economical magnetic fluid may be obtained.

A method according to this invention for preparing a water base magnetic fluid comprises a step of preparing an aqueous colloidal solution of a ferromagnetic powder. Such colloidal solution may be advantageously prepared by the so-called Wet Method.

A first surfactant or aqueous solution thereof is, then, added to the colloidal solution in such a quantity that each particle of the powder is completely coated with a monomolecular layer of the first surfactant by adsorption thereof, and with additional molecules of the first surfactant being adsorbed on the monomolecular layer. In this state each particles may be strongly dispersed in the solution and the solution may be made alkali to above pH 10 by the dissociation of added surfactant.

The first surfactant is an unsaturated fatty acid having 18 carbon atoms or a salt thereof. The unsaturated fatty acid as the first surfactant must be previously neutralized by the addition of alkaline agent such as KOH or NaOH, and supplied as the salt. It is preferred that after addition of the first surfactant, the colloidal solution should have a pH of at least 10 and preferably at least 11. If the pH of the solution is sufficiently alkaline before addition of the first surfactant, it may be added as the acid. If not, it must be added as the alkaline salt.

Thereafter, an acid such as hydrochloric acid or sulfuric acid is added to the solution, to adjust the acidity of the dispersed solution, to pH 7 or less so as to develop a precipitate by flocculation. Any other acid than hydrochloric acid and sulfuric acid may be used similarly, because the role of acid addition is to change the unsaturated fatty acid ion adsorbed on the first adsorption layer to the free molecule which does not contribute to the formation of a colloid dispersion.

The precipitate is separated from the solution, e.g., by settling, decantation or centrifuging, and preferably by filtering and subsequently is cleansed by a cleansing agent.

Then, the cleansed precipitate is peptized in water by adding a second surfactant to provide a water base magnetic fluid in which ferromagnetic powder particles are stably dispersed in water. Each ferromagnetic particle dispersed in the resultant fluid is coated with the monomolecular layer of the first surfactant and with a second surfactant layer adsorbed on the first layer.

The second surfactant which causes the formation of the the colloidal dispersion is an anionic surfactant having 8 to 30 carbon atoms and containing a sulfate, sulfonate or phosphate radical, or a non-ionic surfactant of an ester, ether or alkylphenol type having 8 to 20 carbon atoms and having a hydrophile lipophile balance (H.L.B) of 12 or more.

The unsaturated fatty acid used as the first surfactant in the method of this invention may be advantageously oleic acid, linoleic acid or linolenic acid. These acids may be used in a form of salt, preferably a metallic salt, and more preferably an alkaline metal salt, such as the sodium salt, and the ammonium salt.

As an anionic or nonionic surfactant, alkyl sulfate salt, alkyl benzene sulfonate salt, alkyl phosphate salt or polyoxyethylene alkyl phenyl ether may be advantageously employed.

In the method of this invention, the cleansing agent is a polar solvent, and is advantageously water.

The method of this invention can be applied to produce magnetic fluids including particles of any kind of magnetic oxide materials expressed by the formulae $MO.Fe_2O_3$, where M is one of the divalent ions of transition elements Mn, Fe, Co, Ni, Cu and Zn, or is a combination of them. The particles may be 300 Å or less and advantageously may have an average particle size of 150 Å or less.

Further objects and features of this invention will be understood from following descriptions of embodiments of this invention in conjunction with annexed drawings.

BRIEF DESCRIPTION OF THE DRAWINGS

FIG. 7 shows a sectional view of an apparatus used for obtaining the data in FIG. 6.

DETAILED DESCRIPTION OF PREFERRED EMBODIMENTS

Oleic acid has been known as a dispersing agent for preparing a stable suspension of magnetic particles in a non-polar carrier fluid.

The inventor experimentally analyzed the adsorption of oleate ions to magnetic particles in water.

Figure 1:
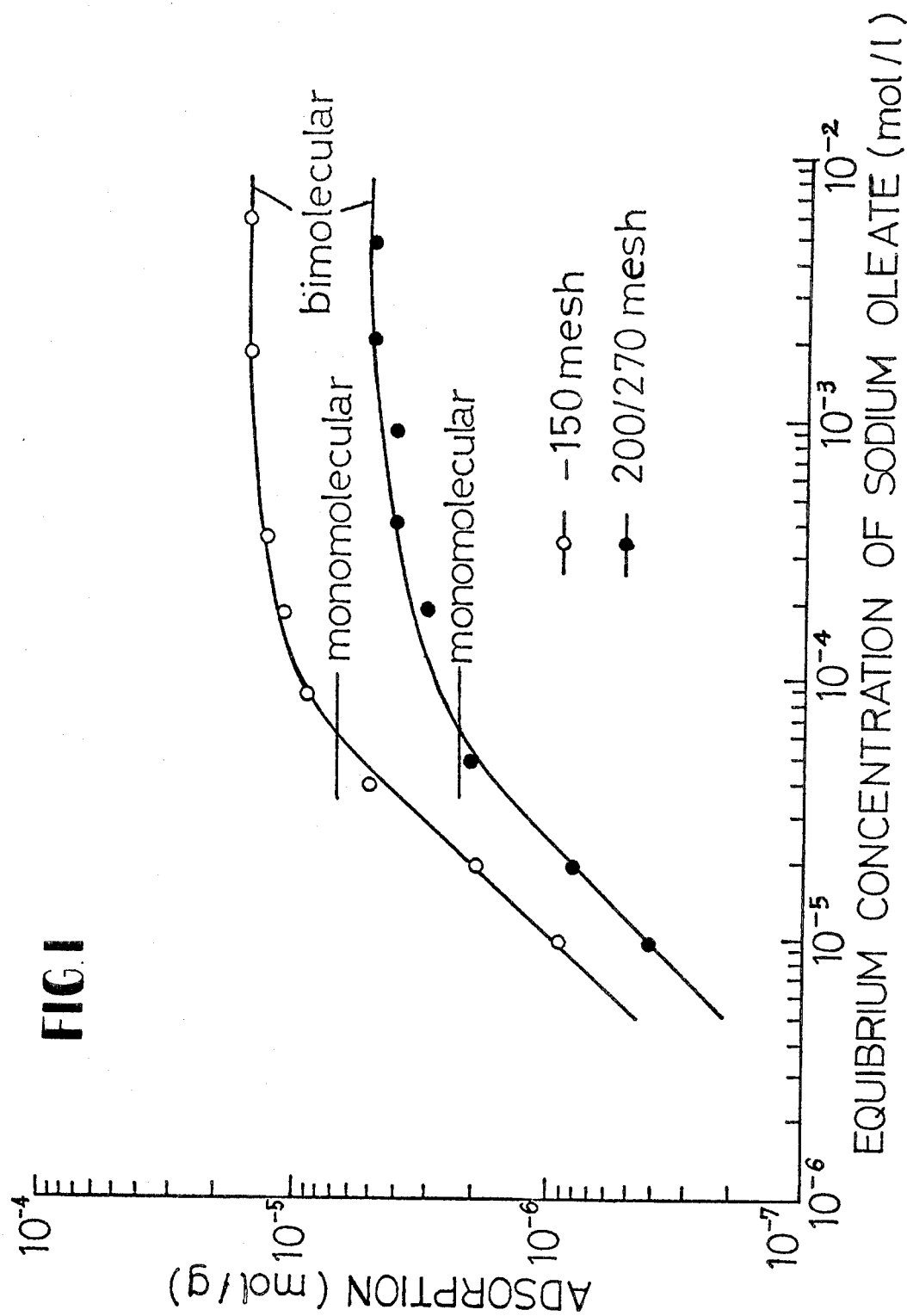
FIG. 1 graphically shows a relationship between the equilibrium concentration of sodium oleate and the amount of adsorption to magnetite particles in water, FIG. 2 graphically shows a relationship between the added amount of the unsaturated fatty acid and the dispersion % of magnetite particles in a finished water base magnetic fluid according to this invention, FIG. 3 graphically shows variation of the viscosity of water base magnetic fluids according to this invention due to the concentration of magnetite of the fluid.

Referring to FIG. 1, which shows a relationship between the equilibrium concentration of sodium oleate and the amount of adsorption of oleate ions to magnetite particles in water, the amount of adsorption increases as the equilibrium concentration increases until saturated.

When the amount of the absorption reaches the saturation condition, each magnetite particle was noted to be coated with a double molecular absorption layer or a bi-molecular layer. This was determined from the sectional area 30 $Å^2$ of an adsorbed oleate ion and the measured BET specific surface area ($cm^2/g$) of a sample particle.

When sodium oleate is added to a colloidal aqueous solution of magnetite particles, oleate ions are adsorbed onto the particles with the hydrophilic radical thereof facing the surface of each particle. This adsorption is noted to be a chemical adsorption.

With increase of added sodium oleate, each particle is almost completely coated with a monomolecular layer of adsorbed oleate ions and, thereafter another adsorption begins in which oleate ions are adsorbed to the monomolecular layer adsorbed on the particle, with the hydrophilic radical thereof facing water. As a result, a bi-molecular adsorption layer is formed on each particle. The amount of adsorption is saturated.

The outer adsorption layer is based physical adsorption so that bonding between the inner adsorption layer and the outer layer may be relatively weaker than that between the particle and the inner adsorption layer.

It is noted that the completion of the inner adsorption layer occurs after the beginning of the partial adsorption of the outer layer and that, after the begining of the adsorption of the outer layer, each particle is dispersed in the carrier water. That is, the dispersion of the magnetic colloid is inevitable for the completion of the first adsorption layer.

These phenomena which are above described in conjunction with oleic acid, are also observed in other unsaturated fatty acid such as linoleic acid, linolenic acid and others.

This is appreciated to be based on the fact that the carboxyl group surfactant exhibits a specific adsorption character to iron oxide and that unsaturated fatty acids have relatively high critical micelle concentration (C.M.C) due to the polarity of the unsaturated portion thereof in spite of the long hydrocarbon chain thereof.

As above described, particles coated with a bi-molecular layer of an unsaturated fatty acid such as oleic acid, are stably dispersed in the carrier water. But this suspension is not stable, if the solution is not an alkaline solution.

Accordingly, the inventor substitutes an outer adsorption layer of a non-ionic or anionic surfactant so as to provide a more stable colloidal suspension of magnetic particles in water.

To this end, it is necessary to remove the outer layer of the bi-molecular layer adsorbed on the magnetic particles.

As above described, the adsorption of the inner layer is based on the chemical adsorption and, on the other hand, the outer layer is formed by the physical adsorption. Accordingly, the outer layer is, theoretically, removed by washing with water or other polar solvents.

But it is very hard to separate the dispersed particles from the carrier water, because the magnetic particles are very small with a particle size, normally less than about 300 Å.

Next experiments were tried.

Sodium oleate (10 g) was added to a collodial aqueous solution of 500 ml containing 20 g of magentite particles having a particle size of about 80 Å. The particles were prepared by a, so-called, Wet Method.

The colloidal solution was maintained at 80 C for 30 minutes in order for the adsorption of oleate to proceed. Then, it was diluted to a volume of 3 l. by water.

The diluted solution was suction-filtered through a filter paper No. 5C which is used for quantitative chemical analysis so that particles were recovered.

Similar experiment was tried in conjunction with 20 g of Ni-Zn ferrite particles having a particle size of about 60 Å.

Recovery of particles and time periods for the filtration in these experiments are indicated in Table 1.

Table 1

| Kinds of magnetic particles | Filtering Time | Recovery of Particles |
|---|---|---|
| Magnetite | 43 hours | 46% |
| Ni-Zn ferrite | 55 hours | 54% |

Table 1 shows a result of one process of filtration.

In order to remove almost all the outer adsorption layer of the particles, washing and filtrating operations must be repeatedly carried out more than five times. To do so, more than 100 hours are spent, and, on the other hand, the recovery of particles is decreased to less than 20%.

The inventor found out that the filtering to remove the outer surfactant layer could be easily achieved by the addition of acid to the colloidal solution of magnetic particles coated with the bi-molecular layer of unsaturated fatty acid to adjust the acidity of the solution of pH 7 or less.

By the addition of the acid to the colloidal solution, the suspension can be rapidly coagulated.

Thus, the coagulate is separated out of the solution by filtration and subsequently cleansed by water or other polar solvent, so that particles coated with a monomolecular layer of an unsaturated fatty acid are recovered without the outer adsorption layer.

Table 2 shows filtrating times and the recovery of particles according to the addition of acid, similarly as Table 1.

Table 2

| Kinds of magnetic particles | Filtering Time | Recovery of particles |
|---|---|---|
| Magnetite | 8 minutes | more than 99 % |
| Ni-Zn ferrite | 8 minutes | more than |

Table 2-continued

| Kinds of magnetic particles | Filtering Time | Recovery of particles |
|---|---|---|
| | | 99 % |

The quantity of the acid added to the colloidal solution is such that the acidity of the solution may be controlled to be substantially equal to the value of pK (which is defined as $H^+$ ion concentration when a concentration of RCOOH is equal to a concentration of $RCOO^-$) of the specific unsaturated fatty acid.

The resultant particles exhibit a strong hydrophobic nature, and this means that the outer layer is almost completely removed from the particles and that each magnetic particle is completely coated with a monomolecular of the unsaturated fatty acid.

Thus, it will be readily noted that, in order to remove the outer adsorption layer, the method by addition of acid is superior to water washing, in not only shorter filtering time but also greater recovery of particles.

The recovered magnetic particles flocculate in water. But the flocculated particles are peptized by addition of anionic or non-ionic surfactant to the water, and a quite stable suspension of magnetic particles is obtained.

A relationship between the added amount of the unsaturated fatty acid and the dispersion % of particles in a finished magnetic fluid was traced as follows.

The dispersion % is defined to be the percentage of stably dispersed magnetite to total magnetite used for the preparation of magnetic fluid, i.e., the percentage of the total magnetite which is stably dispersed.

A magnetite colloid was prepared by adding NaOH aqueous solution to a mixture of ferrous sulfate and a ferric sulfate aqueous solutions with a molecular concentration ratio of 1:1, and thereafter maturing at a temperature of 60° C. The particles have an average particle size of about 70 Å. Samples of the magnetite colloid, each sample being 100 g, were prepared, and different quantities of sodium oleate were added to every sample. Thereafter, a coagulate was caused to settle in each sample colloid by addition of an acid thereto. Each coagulate was recovered by filtering and cleansing operations. Then sodium dodecyl benzene sulfonate (SDBS) (26 g) was added to each coagulate including water to obtain a magnetic fluid. Each magnetic fluid was diluted by water to 20% concentration of dispersed particles and the dispersion % was measured.

Figure 2:
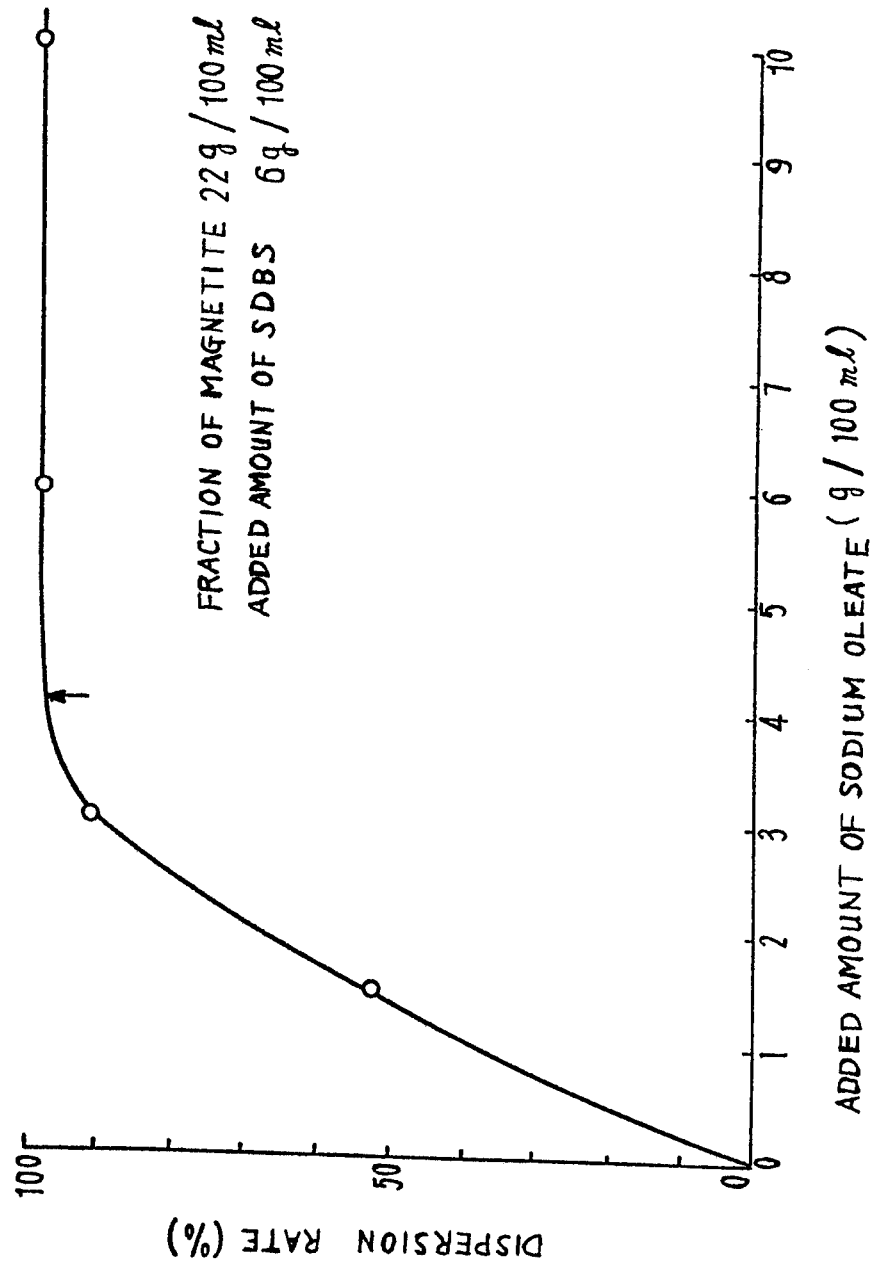

The result of this experiment is shown in FIG. 2. In FIG. 2, the point indicated by an arrow corresponds to the amount of the added sodium oleate when a complete monomolecular adsorption layer is formed on each magnetite particle.

FIG. 2 teaches that the completion of the monomolecular adsorption layer of the surfactant is necessary for the adsorption of the anionic or nonionic surfactant, or for obtaining stable dispersion.

As the anionic surfactant, alkyl sulfate for example sodium dodecyl sulfate (S.D.S.), alkyl benzene sulphonate (for example sodium dodecyl benzene sulfonate) and alkyl phosphate (for example sodium dioctyl phosphate) can be employed in the method of this invention. The hydrophobic group of the surfactant may be an saturated or unsaturated hydrocarbon chain, and the former is preferable from a chemical stability view point. The chain length is limited in 8 to 30 carbon atoms. When the hydrocarbon chain is shorter than 8 carbon atoms, the formation of double adsorption layer effective for stable dispersion can not be expected for the reason that the association is not sufficient between the adsorbed unsaturated fatty acid molecular in first layer and added anionic surfactant molecule. The limit of hydrocarbon chain length in longer side is determined by the length of the usual surfactant which we can actually obtain, for instance, petroleum sulfonate.

As the nonionic surfactant, poly oxyethylene alkyl phenyl ether (for example poly-oxyethylene nonyl phenyl ether), poly oxyethylene alkyl ether (for example poly oxyethylene lauryl ether) or poly oxyethylene alkyl ester (for example poly oxyethylene mono-stearate) may be employed. The conditions of the employment of these nonionic surfactants are that the length of the hydrophobic hydrocarbon chain must be in the range of 8 to 20 carbon atoms and that a hydrophile lipophile balance (H.L.B.) of the nonionic surfactant is 12 or more. If the hydrocarbon chain is shorter than 8 carbon atoms, the double adsorption can not be realized. If the H.L.B. of the surfactant is less than 12, dispersion of the magnetic colloid can not be attained.

On the other hand, a cationic surfactant cannot be used to peptize the recovered precipitate in water. The reason may be that the cationic surfactant is hardly adsorbed onto particles coated with the monomolecular layer of the first anionic surfactant, with the hydrophilic radical thereof facing water, because the monomolecular coated particle has a negative charge in water.

Figure 3:
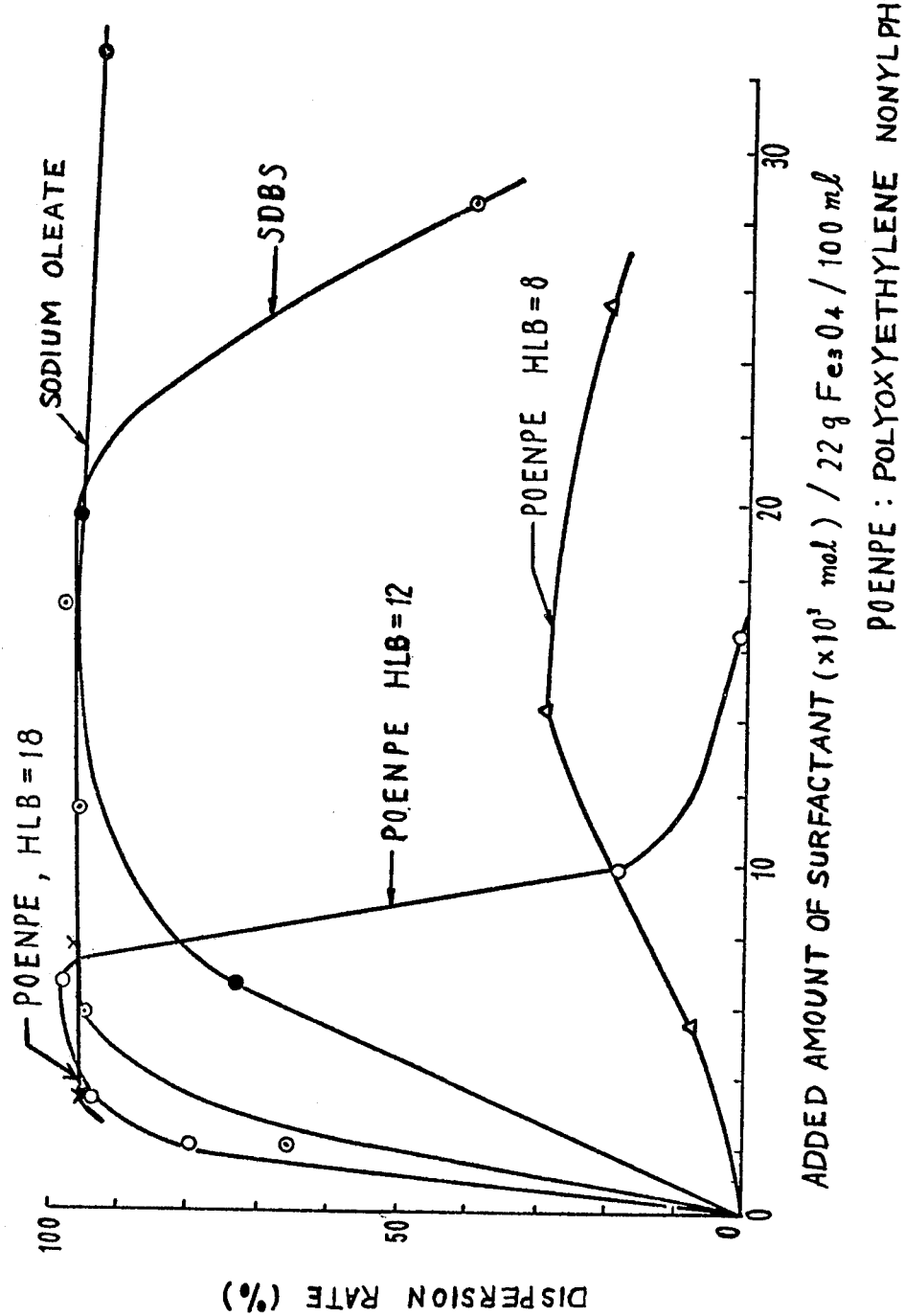

The magnetic solid content of the ferromagnetic fluid is particularly important from the practical application view point. The solid content influences the magnetization, viscosity and the apparent density of the fluid. FIG. 3 shows the relation between the solid content of the fluid and the viscosity of it. The magnetization in a constant magnetic field parallels the magnetite content of the fluid. When colloid content of the fluid is increased to obtain a large magnetization, the fiber-like coagulated phase is partially formed in the suspension whose magnetic particle content being more than 40 vol %. Finally, the suspension, whose colloid content is above 48 vol %, changes into gel-like aggregate. Here, the thickness of the adsorbed surfactant layer is regarded to be included in the particle volume by approximating the thickness to be about 20 Å. Accordingly, the range of the colloid concentration of the fluid which we can use as a magnetic fluid extends over 0.1 to 48 vol %, corresponding to the solid content 0.005 to 0.7 g/ml. In this concentration range, a dilute fluid will be used as magnetic ink. The fluid of intermediate concentration; such as 0.1 to 0.6 g/ml., will be used for various objects such as magneto-gravity separation, remote positioning, sealing, and so on. The more dense fluid will be used for damping, sealing or recovering media of oil spills.

Examples according to this invention will be described hereinafter.

EXAMPLE 1

An aqueous solution of ferrous sulfate with a concentration of 1 mol./l. and another aqueous solution of a ferric sulfate with a concentration of 1 mol./l. were mixed in the molar ratio of $Fe^{2+}$ and $Fe^{3+}$ of 1:2. To the mixed solution of 200 ml. NaOh aqueous solution of 6N was added to adjust the acidity of the solution to a pH 11.5. Then the solution contained in a glass beaker was matured for two hours to produce a magnetite colloid. A plurality of samples of the magnetite colloid were prepared by maturing at different temperatures.

A 60 ml aqueous solution of sodium oleate with a concentration of 10% was added to each sample of the said colloidal aqueous solution. The solution was maintained at a temperature of 80° C during a time of 30 minutes for the adsorption of the oleate on each colloidal particle. Thereafter an aqueous solution of HCl (3N was added until the pH of the colloidal solution was 5.5, to flocculate. The coagulate was separated out of the solution by filtering with filter paper No. 5A, which is used for quantitative analysis. The separated coagulate was cleansed by 5 of distilled water and, thereafter, was subjected to a filtration to obtain a flocculated cake containing 50%.

SDBS was added to the flocculated cake, and was intermixed. Then the coagulate including water changed into a fluid of a relatively low viscosity. Accordingly, a magnetic fluid was produced. The resultant magnetic fluid was diluted by water to a solid concentration of 10%, and was stably kept in a measuring cylinder of 100 ml during 5 days. Thereafter the dispersion rate of the particles or a rate of the amount of particles dispersed in the water to the amount of all particles contained in the water, was measured.

Table 3 shows a relationship of maturing temperatures of magnetite colloids, diameter measured by BET* specific surface area and dispersion %.

*The area calculated using the theory of adsorption isotherms of S. Brunauer, P. H. Emmet and E. Teller.

Table 3

| Maturing Temp. | Diameter measured by BET specific surface area | Dispersion % |
|---|---|---|
| 60° C | 70 Å | More than 99% |
| 100° C | 90 Å | More than 99% |
| 180° C | 150 Å | 83% |
| 250° C | 220 Å | 12% |
| 300° C | 280 Å | 0% |

Table 3 indicates that the dispersion % rapidly decreases when the average particle size is more than 150 Å.

This leads to the conclusion that the magnetic attraction may overcome the dispersion force due to the surfactant, with increased particle size of the magnetic particles.

EXAMPLE 2

Magnetite colloidal particles with an average particle size of 70 Å were coated with a monomolecular layer of oleate by a similar method as in Example 1.

Figure 4:
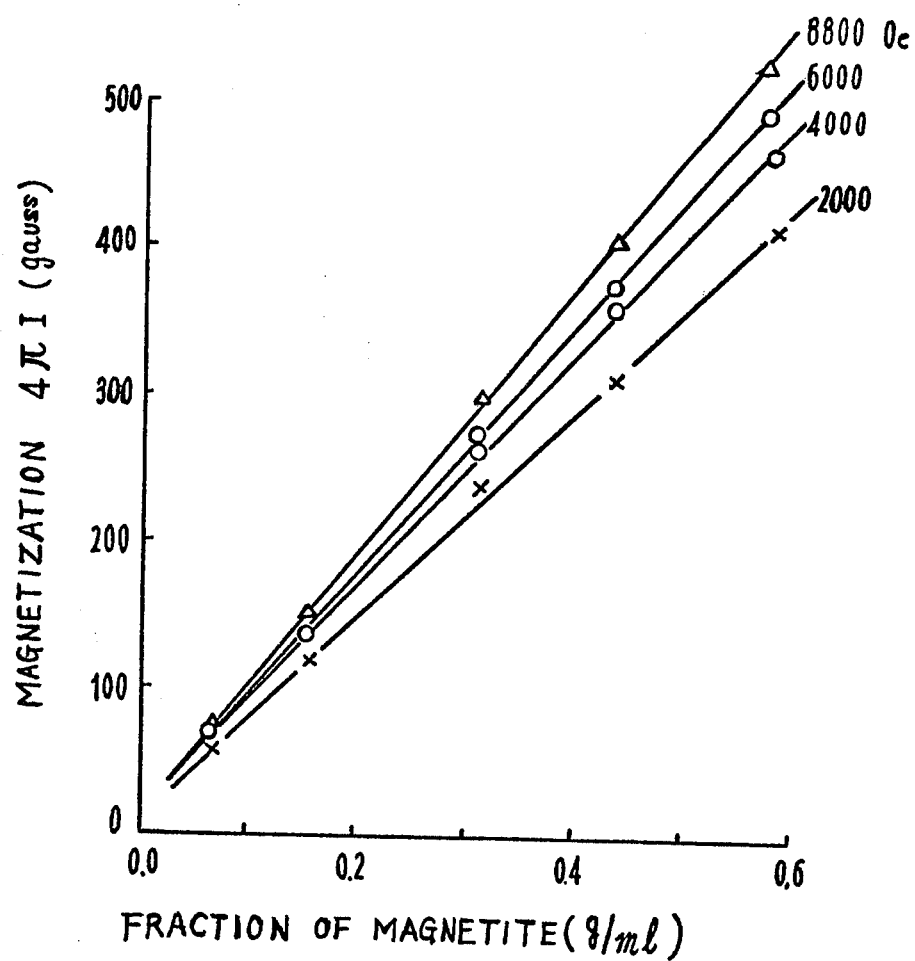
FIG. 4 graphically shows variation of the dispersion % of magnetite particles in a finished water base magnetic fluid according to this invention for different surfactants, with reference to various added amounts thereof, FIG. 5 graphically shows a relationship between the magnetite concentration and the magnetization of a water base magnetic fluid according to this invention, FIG. 6 graphically shows specific gravity of a water base magnetic fluid according to this invention after the application of different magnetic fields.

A surfactant was added to water containing the particles (of 20% by weight) coated with the monomolecular layer to peptize the flocculated particles in the water. The dispersion % of the resultant magnetic fluid was measured. FIG. 4 shows variations of the dispersion % with reference to various added amount of five different surfactants.

FIG. 4 teaches that H.L.B. of the POENPE used to peptize the flocculated particles in water must be 12 or more.

EXAMPLE 3

A colloidal aqueous solution (1l) was prepared by a wet method, which containing magentite particles with a BET average particle size of 110Å. Sodium oleate (40 gr.) was added into the colloidal solution, which solution was, in turn, maintained at a temperature of 80° C during 30 minutes. After cooling, HCl (aqueous solution 3N) was added to adjust the acidity of the colloidal solution to a pH 5.5 to produce a precipitate by flocculation.

The precipitate was separated by suction filtration and cleansed with distilled water (10l). SDBS (40 gr.) was added to the resultant flocculated particles in water. Then the mixture was diluted by adding water to a total of 200 ml. After agitation of the diluted solution during 30 minutes, a water base magnetic fluid was obtained. By diluting the resultant water base magnetic fluid by water, desired magnetic fluids were obtained which have desired magnetization.

Figure 5:
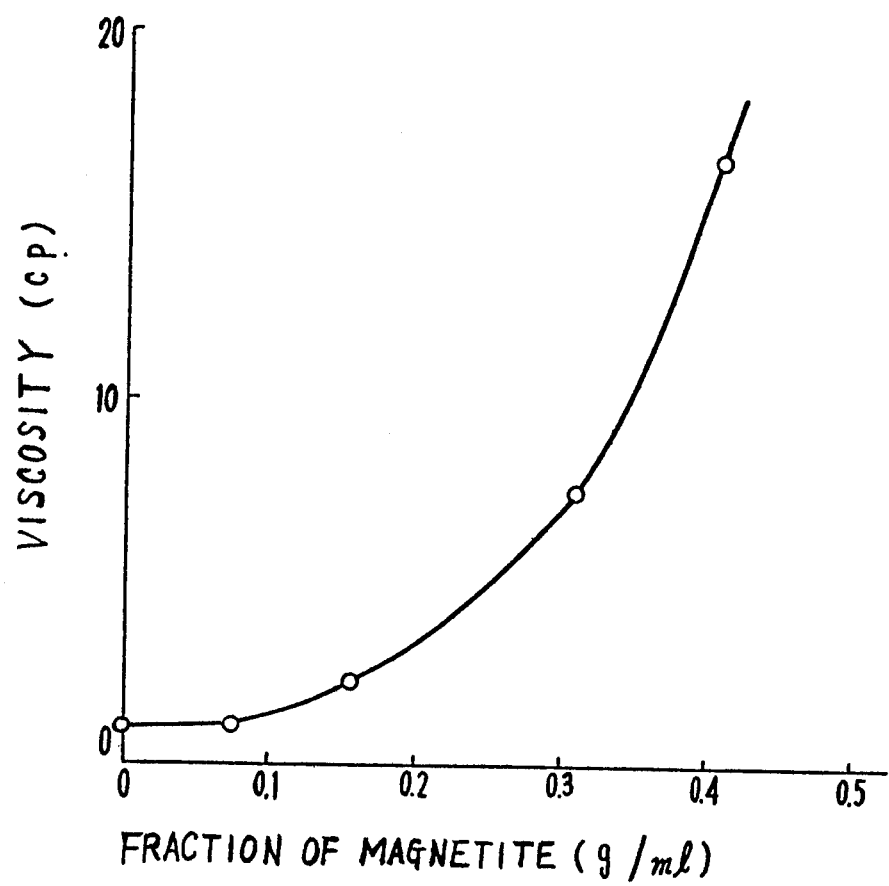

FIG. 5 shows the relationship of the magnetite concentration and the saturation magnetization of the magnetic fluid in various magnetic fields.

The viscosity of the magnetic fluid changes with the weight of magnetic particle per unit volume, as shown in FIG. 3.

The magnetic particles did not settle out of the resultant water base magnetic fluid under the influence of a magnetic field.

Referring to FIG. 7, the obtained water base magnetic fluid was contained in a glass tube 72 which was disposed between pole pieces 71 of an electromagnet. Then the electromagnet was energized to expose the fluid in a magnetic field during 210 minutes. Thereafter, the magnetic fluid was pipetted out from the glass tube 72 at different depths thereof and the specific gravity of each sample was measured. The measured data are shown in FIG. 6 together with magnetic field strength H and gradient thereof dH/dx, where $x$ is the distance (cm) from a center of the pole pieces 71 along the glass tube 72 as shown in FIG. 7.

Figure 6:
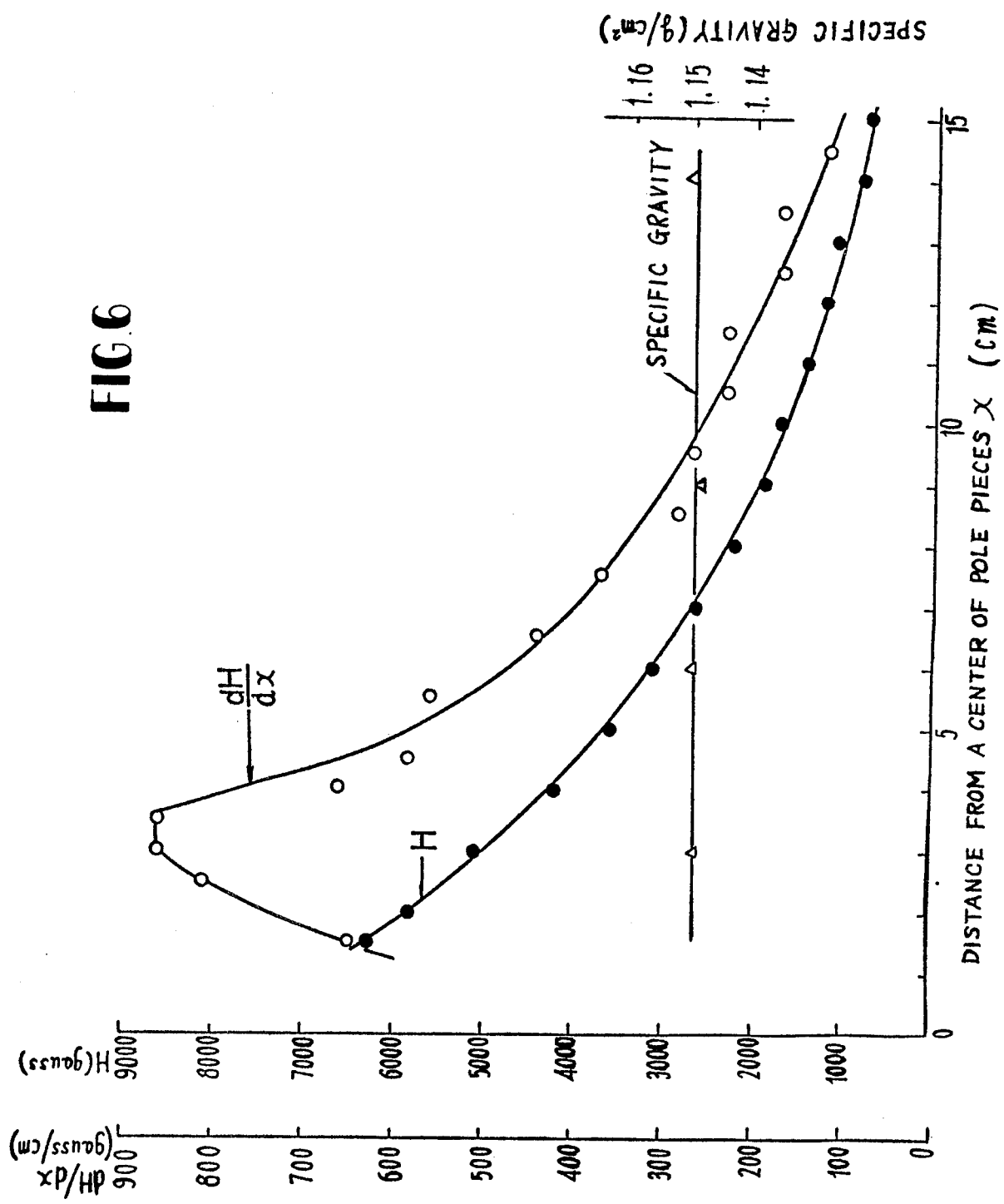

Referring to FIG. 6, the specific gravity of the magnetic fluids is constant at all depths of the glass tube 72. This teaches that the dispersion of particles of the water base magnetic fluid is not influenced by the application of a magnetic field thereto.

Furthermore, the water base magnetic fluid was ascertained to be quite stable when the acidity of the carrier fluid is a value of pH of 4 or higher.

EXAMPLE 4

The colloidal aqueous solutions of various ferrites listed in Table 4 were prepared by the so-called Wet Methods. The conditions of ferrite formation in the Wet Method and average particle size of each product were also shown in Table 4. Each solution was adjusted so as to contain 100 g of ferrite solid in 1l of the solution. Then, they were treated by the method of Example 3, so that an aqueous magnetic fluid was obtained from every solution.

Table 4

| ferrite | pH of the reaction | Maturing temperature | Maturing duration | Average particle size |
|---|---|---|---|---|
| $MnFe_2O_4$ | 12.5 | 100° C | about 2hrs | 90 Å |
| $NiFe_2O_4$ | 12.0 | 180° C | about 2hrs | 110 Å |
| $CuFe_2O_4$ | 10.5 | 130° C | about 2hrs | 90 Å |
| $CoFe_2O_4$ | 11.0 | 100° C | about 2hrs | 85 Å |
| $Mn_{0.5}Zn_{0.5}Fe_2O_4$ | 11.0 | 100° C | about 2hrs | 90 Å |
| $Ni_{0.5}Zn_{0.5}Fe_2O_4$ | 11.5 | 130° C | about 2hrs | 80 Å |

EXAMPLE 5

A colloidal aqueous solution of magnetite particles was prepared by mixing an aqueous solution of ferrous sulfate with a concentration of 1 mol./l. and another aqueous solution of ferric sulfate with a concentration of 1 mol./l. in the molar ratio of $Fe^{2+}$ and $Fe^{3+}$ of 1 : 2, adding a 6N aqueous NaOH to the resultant mixed solution (100 ml) until the solution has a pH of 11.0, and thereafter maturing the solution at 60° C during 30 minutes. Linoleic acid (8 gr.) and 9.6 ml NaOH aqueous solution of 3N were mixed by agitation with simultaneous addition of water of 50 ml. The resultant solution was heated to 60° C, and was added to the colloidal aqueous solution, after the white precipitate of soidum linolate was dissolved. The mixture was agitated at 90° during 30 minutes. After cooling an HCl aqueous solution (1N) was added to the resultant dolloidal solution to adjust the pH of the colloidal solution to 5.5 whereby a precipitate developed by flocculation. After diluting with water to 1l., the precipitate was separated by filtering with filter paper No. 5A.

The separated precipitate was put into distilled water (1l.) and subsequently separated by filtering so that the precipitate was cleansed with water. The precipitate was subjected to such a cleansing operation 3 times, and then mixed with SDS (7 gr.) and water, with the total volume being 100 ml. Then the precipitate peptized in the water so that a water base magnetic fluid was produced with a relatively low viscosity.

EXAMPLE 6

An equeous solution of ferrous sulfate with a concentration of 1 mol./l. and another solution of a ferric sulfate with a 1 mol./l. were mixed in the molar ratio of $Fe^{2+}$ and $Fe^{3+}$ of 1: 2. To the mixed solution of 2l, a 6N NaOH aqueous solution was added to adjust the pH of the solution to 11.5. Then the solution contained in a stainless bucket was matured at 60° C during 2 hours to produce a magnetite colloid. After cooling, the colloidal suspension settled and the clarified upper solution was removed. Then the whole volume was adjusted to 5l. by adding distilled water. Next, the suspension was divided equally into 20 portions. Each 250 ml. suspension contains about 10 g of the magnetite colloid.

To each portion, 30 ml aqueous solution of sodium oleate with a concentration of 10% was added and the solutions were maintained at a temperature of 80° C during a time of 30 minutes for the adsorption of oleate to each colloid particle. Thereafter an aqueous solution of HCl (3N) was added until the pH of each solution was 5.5 to coagulate the suspension. The coagulate was separated from the solution by filtering with filter paper No. 5A.

The separated coagulates were cleansed by distilled water of 2.5l. and, thereafter, subjected to a filtration to obtain coagulated cakes containing water (about 50%). Then, 3 g. of an anionic or monionic surfactant listed in Table 5 were added to each coagulated cake and intermixed. The stability of the finished suspension is shown in Table 5.

Table 5

| Surfactant added for the formation of second absorption layer | | Stability of the finished suspension |
|---|---|---|
| Sodium hexyl sulfate $C_6H_{13}SO_4Na$ | | not stable |
| Sodium octyl sulfate $C_8H_{17}SO_4Na$ | | stable |
| Sodium tetradecyl sulfate $C_{14}H_{29}SO_4Na$ | | stable |
| Sodium decyl sulfonate $C_{10}H_{21}SO_3Na$ | | stable |
| Petroleum sulfonate (averaged carbon number per molecule is 28 by chemical analysis) | | stable |
| Dodecyl amine acetate | | not stable |
| hexadecyl-trimetyl ammonium chloride $[C_{16}H_{33}N(CH_3)_3]Cl$ | | not stable |
| Polyoxyethylene oleil ether $C_{18}H_{35}O(CH_2CH_2O)nH$ | HLB = 11.4 | not stable |
| | HLB = 13.6 | stable |
| | HLB = 16.6 | stable |

Table 5-continued

| Surfactant added for the formation of second absorption layer | | Stability of the finished suspension |
|---|---|---|
| Polyoxyethylene oleic ether $C_{12}H_{25}O(CH_2CH_2O)nH$ | HLB = 9.2 | not stable |
| | HLB = 16.2 | stable |
| Polyoxyethylene lauryl phenol ether $C_8H_{17}$⟨⟩$O(CH_2CH_2O)nH$ | HLB = 9.8 | not stable |
| | HLB = 12.6 | stable |
| | HLB = 14.4 | stable |
| Polyoxyethylene mono stearate $C_MH_{35}CO_2(CH_2CH_2O)nH$ | HLB = 12.8 | stable |
| | HLB = 16.7 | stable |

The aqueous alkaline solutions containing the colloidal magnetic particles of the present invention are very preferably prepared by the so-called Wet Method which is exemplified hereinbefore. An aqueous solution of a mixture of salts of the metal ions is formed. These aqueous solutions are generally formed from salts that are somewhat acidic, e.g., the sulfates. The ferromagnetic oxide powders are formed by adding an alkaline hydroxide to said solution to form an admixture of the ferromagnetic oxides (sometimes in the hydrated oxide or initially hydroxide form). These are then matured.

According to the method of this invention, very stable water base magnetic fluids can be produced through relatively simple processes and with low cost. So that this invention provides magnetic fluids with reduced cost.

What is claimed is:

1. A method for preparing a stable aqueous magnetic fluid comprising:

preparing an aqueous colloidal solution of a ferromagnetic powder of the formula $MO.Fe_2O_3$ wherein M is at least one metal selected from the group consisting of Fe, Mn, Zn, Cu, Co and Ni;

making said solution alkaline and adding a first surfactant which is an unsaturated fatty acid containing 18 carbon atoms to the solution in an amount such that each particle of said powder is completely coated with a monomolecular layer of said first surfactant by adsorption with additional molecules of said first surfactant being adsorbed on said monomolecular layer whereby each particle is dispersed in the solution, said first surfactant being an unsaturated fatty acid having 18 carbon atoms or a salt thereof;

adding an acid solution to said alkaline solution containing said dispersed particles to adjust the pH to a value not in excess of 7 whereby said dispersed particles precipitate of flocculation;

separating said precipitated particles from the solution;

washing said precipitated particles to remove the portion of said first surfactant from said particle which is in excess of the monomolecular layer coating said precipitated particles and to form a water admixture with said precipitated particles; and then adding a second surfactant to said admixture of the separated precipitated particles to form an absorbed coating of said second surfactant on said monomolecular layer of said first surfactant and to peptize and form an aqueous magnetic fluid in which said ferromagnetic powder particles are stably dispersed in water, said second surfactant being free of cationic surfactants and consisting essentially of an anionic surfactant containing between about 8 and 30 carbon atoms in its hydrophobic group other than said first surfactant, or a non-ionic surfactant having 8–20 carbon atoms in its hydrophobic group and having a hydrophile lipophile balance of at least 12.

2. The method as claimed in claim 1, in which said first surfactant is one of oleic acid, linoleic acid, linolenic acid and salts thereof.

3. The method as claimed in claim 2 in which said salts are alkaline metal or ammonium salts, and said first surfactant is oleic acid or one of said salts thereof.

4. The method as claimed in claim 3, in which said second surfactant is selected from the group consisting of sodium alkyl sulfate, sodium alkyl benzene sulfonate, sodium alkyl phosphate, polyoxyethylene alkyl ether, polyoxyethylene alkyl ester, and polyoxyethylene alkyl phenyl ether.

5. The method as claimed in claim 4 wherein said aqueous alkaline solution containing said first surfactant has a pH of above about 11.

6. The method as claimed in claim 3, in which said second surfactant is sodium dodecyl sulfate.

7. The method as claimed in claim 3, in which said second surfactant is sodium dodecyl benzene sulfonate.

8. The method of claim 2 wherein said second surfactant is selected from the group consisting of alkyl sulfate, alkylbenzene sulfate, and alkyl phosphate.

9. The method of claim 2 wherein said second surfactant is selected from the group consisting of polyoxyethlene alkyl ether, polyoxyethylene alkyl ester, and polyoxyethylene alkylphenyl ether.

10. The method as claimed in claim 1, wherein a polar solvent is used to wash said precipitate.

11. The method as claimed in claim 1, in which said ferromagnetic powder is one of magnetite, manganese ferrite, nickel ferrite, copper ferrite, cobalt ferrite, manganese-zinc ferrite and nickel zinc ferrite.

12. The method as claimed in claim 1, in which said ferromagnetic powder has an average particle size of 150 A or less.

13. The method as claimed in claim 1, in which said acid solution is at least one acid selected from the group consisting of hydrochloric acid and sulfuric acid.

14. The method as claimed in claim 1, in which said acid solution is added into the dispersed solution in an amount so that the acidity of the dispersed solution is substantially equal to the value of pK of the first surfactant.

15. The method as claimed in claim 1, wherein said aqueous alkaline solution containing said first surfactant has a pH of above about 10.

16. The method as claimed in claim 1 wherein said aqueous colloidal solution of a ferromagnetic powder is produced by precipitation of a mixture of the metal oxides from an aqueous solution of their salts.

17. The method as claimed in claim 16 wherein said colloidal solution is prepared by preparing an aqueous acidic solution of salts of the metal ions and then adding an alkaline solution to form a mixture of the metal ions in oxide or hydrated oxide form and then maturing.

18. The method as claimed in claim 1 in which said acid solution which is added to adjust the pH to a value not in excess of 7 is an aqueous inorganic acid solution.

19. A stable aqueous magnetic fluid having a pH of above about 4 comprising water having stable dispersed therein ferromagnetic oxide particles of a particle size below about 300 Å, each of said magnetic particles having a two layer surfactant coating comprising an inner layer and an outer layer, the inner layer being a monomolecular layer of an 18 carbon atoms unsaturated fatty acid or salt thereof which completely coats said magnetic particle, and the outer layer being an outer coating free of cationic surfactants and consisting essentially of (i) an anionic surfactant having 8 to 30 carbon atoms in its hydrophobic radical other than said first surfactant, or (ii) a non-ionic surfactant having 8 to 20 carbon atoms in it hydrophobic radical and having a hydrophile balance of at least 12 which completely covers said inner layer, said aqueous fluid containing between about 0.005 and 0.7 g/ml of said coated ferromagnetic oxide particles.

20. The fluid of claim 14 wherein said unsaturated fatty acid is oleic acid.

21. The fluid of claim 20 wherein said outer layer is one anionic surfactant selected from the group consisting of alkyl sulfate, alkylbenzene sulfate, and alkyl phosphate.

22. The fluid of claim 20 wherein said outer layer is one non-ionic surfactant selected from the group consisting of polyoxyethylene alkyl ether, polyoxyethylene alkyl ester, and polyoxyethylene alkylphenyl ether.

* * * * *